United States Patent
Melnik et al.

(10) Patent No.: US 11,900,662 B2
(45) Date of Patent: Feb. 13, 2024

(54) METHOD, APPARATUS, AND COMPUTER PROGRAM PRODUCT FOR TRAINING A SIGNATURE ENCODING MODULE AND A QUERY PROCESSING MODULE TO IDENTIFY OBJECTS OF INTEREST WITHIN AN IMAGE UTILIZING DIGITAL SIGNATURES

(71) Applicant: HERE Global B.V., Eindhoven (NL)

(72) Inventors: Ofer Melnik, Weehawken, NJ (US); Mark Thompson, Lake Forest Park, WA (US)

(73) Assignee: HERE GLOBAL B.V., Eindhoven (NL)

( * ) Notice: Subject to any disclaimer, the term of this patent is extended or adjusted under 35 U.S.C. 154(b) by 337 days.

(21) Appl. No.: 17/123,935

(22) Filed: Dec. 16, 2020

(65) Prior Publication Data

US 2022/0188346 A1 Jun. 16, 2022

(51) Int. Cl.
*G06V 10/82* (2022.01)
*G06F 16/51* (2019.01)
(Continued)

(52) U.S. Cl.
CPC .............. *G06V 10/82* (2022.01); *G06F 16/51* (2019.01); *G06F 16/535* (2019.01); *G06F 16/5854* (2019.01); *G06V 10/40* (2022.01)

(58) Field of Classification Search
None
See application file for complete search history.

(56) References Cited

U.S. PATENT DOCUMENTS 8,131,118 B1 3/2012 Jing et al.
8,625,902 B2 1/2014 Baheti et al.
(Continued)

FOREIGN PATENT DOCUMENTS

AU 2017229500 A1 * 8/2018 .......... G06F 16/583
CN 101535986 A 9/2009
(Continued)

OTHER PUBLICATIONS

Alfarrarjeh et al., "A Data-Centric Approach for Image Scene Localization", 2018 IEEE International Conference on Big Data, (Dec. 10-13, 2018), pp. 594-603.
(Continued)

*Primary Examiner* — Bernard Krasnic
(74) *Attorney, Agent, or Firm* — ALSTON & BIRD LLP (57) ABSTRACT

A method, apparatus and computer program product train a signature encoding module and a query processing module. In a method, at least one of the signature encoding module and the query processing module is trained by providing the signature encoding module with a reference image containing a particular object of interest that is marked therewithin. The method generates a digital signature of the object of interest and at least some context associated therewith and provides the query processing module with a query image and the digital signature representing the object of interest and at least some of the context associated therewith. The method additionally identifies the object of interest within the query image based upon the digital signature and modifies at least one of the signature encoding module or the query processing module based upon a qualitative or quantitative difference between the objects of interest identified within the query image and marked in the reference image.

20 Claims, 3 Drawing Sheets

(51) Int. Cl.
  *G06F 16/583* (2019.01)
  *G06F 16/535* (2019.01)
  *G06V 10/40* (2022.01)

(56) References Cited

U.S. PATENT DOCUMENTS

| | | | |
|---|---|---|---|
| 10,452,071 | B1 | 10/2019 | Ebrahimi et al. |
| 10,726,312 | B2 | 7/2020 | Butt et al. |
| 10,916,001 | B2 | 2/2021 | Lu et al. |
| 11,113,587 | B2 | 9/2021 | Butt et al. |
| 2007/0005571 | A1 | 1/2007 | Brewer et al. |
| 2011/0060666 | A1 | 3/2011 | Gromek et al. |
| 2011/0135191 | A1 | 6/2011 | Lyuh et al. |
| 2012/0027290 | A1 | 2/2012 | Baheti et al. |
| 2012/0166074 | A1 | 6/2012 | Weng et al. |
| 2012/0294520 | A1 | 11/2012 | Mei et al. |
| 2014/0133310 | A1* | 5/2014 | Pau .................. H04N 19/115 370/236 |
| 2014/0281945 | A1 | 9/2014 | Avni et al. |
| 2015/0278224 | A1* | 10/2015 | Jaber .................. G06F 16/583 707/758 |
| 2016/0300118 | A1* | 10/2016 | Murray .................. G06V 10/56 |
| 2018/0101730 | A1 | 4/2018 | Wu |
| 2018/0137551 | A1 | 5/2018 | Zheng et al. |
| 2018/0157939 | A1 | 6/2018 | Butt et al. |
| 2018/0204083 | A1 | 7/2018 | Goyal et al. |
| 2018/0225514 | A1 | 8/2018 | Anastassacos et al. |
| 2018/0227482 | A1 | 8/2018 | Holzer et al. |
| 2018/0373959 | A1 | 12/2018 | Rhoads et al. |
| 2019/0073553 | A1 | 3/2019 | Yao et al. |
| 2019/0122072 | A1 | 4/2019 | Cricri et al. |
| 2019/0147655 | A1 | 5/2019 | Galera et al. |
| 2019/0272284 | A1* | 9/2019 | Jaber .................. G06F 16/583 |
| 2019/0302290 | A1 | 10/2019 | Alwon |
| 2019/0303725 | A1 | 10/2019 | Gurvich et al. |
| 2020/0005542 | A1 | 1/2020 | Kocharlakota et al. |
| 2020/0183047 | A1 | 6/2020 | Denli et al. |
| 2020/0193206 | A1 | 6/2020 | Turkelson et al. |
| 2020/0234466 | A1 | 7/2020 | Holzer et al. |
| 2020/0320356 | A1 | 10/2020 | Butt et al. |
| 2020/0401617 | A1* | 12/2020 | Spiegel .................. G06F 16/587 |
| 2020/0402541 | A1 | 12/2020 | Talbot et al. |
| 2021/0004589 | A1 | 1/2021 | Turkelson et al. |
| 2021/0056761 | A1 | 2/2021 | Nigam et al. |
| 2021/0141793 | A1* | 5/2021 | Kar .................. G06F 16/24522 |
| 2021/0174113 | A1 | 6/2021 | Shin et al. |
| 2021/0335050 | A1 | 10/2021 | Zavesky et al. |
| 2022/0188346 | A1 | 6/2022 | Melnik et al. |
| 2022/0198215 | A1 | 6/2022 | Melnik et al. |
| 2022/0198701 | A1 | 6/2022 | Melnik et al. |
| 2022/0198721 | A1 | 6/2022 | Melnik et al. |
| 2023/0186517 | A1 | 6/2023 | Melnik et al. |

FOREIGN PATENT DOCUMENTS

| | | |
|---|---|---|
| CN | 110263746 A | 9/2019 |
| KR | 102266996 B1 | 6/2021 |
| WO | WO 2018/031050 A1 | 2/2018 |
| WO | WO 2020/020472 A1 | 1/2020 |

OTHER PUBLICATIONS

Extended European Search Report for European Application No. 21214679.9 dated May 13, 2022, 12 pages.
Extended European Search Report for European Application No. 21214761.5 dated May 13, 2022, 12 pages.
Extended European Search Report for European Application No. 21216006.3 dated May 23, 2022, 8 pages.
Extended European Search Report for European Application No. 21216037.8 dated Jun. 7, 2022, 7 pages.
Hu et al., "ALPS Accurate Landmark Positioning at City Scales", ACM International Joint Conference on Pervasive and Ubiquitous Computing (UbiComp 2016), (Jul. 2016), 12 pages.
Luo et al., "Geotagging in Multimedia and Computer Vision—A Survey", Multimed Tools Appl, (Oct. 19, 2010), 25 pages.
Sagrebin et al., "Real-Time Moving Object Detection for Video Surveillance", 2009 Sixth IEEE International Conference on Advanced Video and Signal Based Surveillance, (Sep. 2-4, 2009), 6 pages.
Zhang et al., "Parallel Connecting Deep Shallow CNNs for Simultaneous Detection of Big and Small Objects", Pattern Recognition and Computer Vision (PRCV 2018), Lecture Notes in Computer Science, (Nov. 2, 2018), 12 pages.
Office Action for U.S. Appl. No. 17/123,485 dated Aug. 2, 2022.
Notice of Allowance for U.S. Appl. No. 17/132,876 dated Aug. 25, 2022.
Nirikin et al., "HyperSeg: Patch-Wise Hypernetwork for Real-Time Semantic Segmentation", 2021 IEEE/CVF Conference on Computer Vision and Pattern Recognition (CVPR), arXiv:2012.11582v2, (Apr. 8, 2021), 15 pages.
Chaudhury et al., Auto-Rectification of Users Photos, https://static.googleusercontent.com/media/research.google.com/en//pubs/archive /42532.pdf, 2014.
U.S. Appl. No. 17/123,485, filed Dec. 16, 2020, In re: Melnik et al. entitled, "Method, Apparatus, and Computer Program Product For Identifying Objects Of Interest Within An Image Captured By A Relocatable Image Capture Device".
Extended European Search Report for European Application No. 22211724.4 dated Apr. 13, 2023, 11 pages.
Notice of Allowance for U.S. Appl. No. 17/132,876 dated Oct. 19, 2022.
Final Office Action for U.S. Appl. No. 17/123,485 dated Dec. 5, 2022.
Non-Final Office Action for U.S. Appl. No. 17/132,911 dated Mar. 6, 2023.
Non-Final Office Action for U.S. Appl. No. 17/132,860 dated Mar. 13, 2023.
Non-Final Office Action for U.S. Appl. No. 17/123,485 dated Jul. 25, 2023.
Notice of Allowance for U.S. Appl. No. 17/132,911 dated Jul. 12, 2023.
Corrected Notice of Allowance for U.S. Appl. No. 17/132,911 dated Jul. 20, 2023.
Notice of Allowance for U.S. Appl. No. 17/132,860 dated Jul. 13, 2023.
Office Action for European Application No. 21214679.9 dated Dec. 12, 2023, 9 pages.
Non-Final Office Action for U.S. Appl. No. 18/164,259 dated Oct. 12, 2023, 8 pages.

* cited by examiner

METHOD, APPARATUS, AND COMPUTER PROGRAM PRODUCT FOR TRAINING A SIGNATURE ENCODING MODULE AND A QUERY PROCESSING MODULE TO IDENTIFY OBJECTS OF INTEREST WITHIN AN IMAGE UTILIZING DIGITAL SIGNATURES

TECHNOLOGICAL FIELD

An example embodiment relates generally to a method, apparatus, and computer program product for training at least one of a signature encoding module and a query processing module to identify objects of interest within an image and, in one embodiment, for training a signature encoding module to generate a digital signature representative of an object of interest and at least some of the context associated with the object of interest within an image and for correspondingly training a query processing module to utilizing the digital signature to identify the object of interest within another image.

BACKGROUND

Applications of Augmented Reality (AR) typically involve superimposing a computer-generated image on a user's view of the real world, thus providing a composite view. In some examples, video may be enhanced in real-time by overlaying a camera image with additional data related to what is being shown in the video.

Approaches to such enhancements have revolved around three-dimensional (3D) mapping and 3D positioning. For example, one approach may involve mapping continuous video to 3D point clouds while localizing within the 3D point clouds. However, approaches such as these are difficult to scale since the type and amount of data that is generated imposes significant demands upon the amount of processing power needed to process such data, particularly in real-time.

BRIEF SUMMARY

A method, apparatus and computer program product are therefore provided in accordance with an example embodiment in order to generate and utilize digital signatures to identify objects of interest within images. Rather than 3D mapping, a two-dimensional (2D) approach may be employed to generate portable compact signatures that allow objects of interest, such as stationary objects of interest, to be recognized and highlighted within images in an efficient manner. As such, detection of objects of interest utilizing digital signatures may be performed faster and more efficiently than other approaches, such as approaches that perform 3D localization for data stored in a 3D point cloud utilizing, for example, exhaustive back end processing. Advantageously, the generated digital signatures may be compact and thus can be stored and delivered as needed on edge devices, making digital signatures useful for many applications that are dependent upon the identification of objects of interest within images.

In an embodiment, a method for training at least one of a signature encoding module and a query processing module is provided. The method includes training at least one of the signature encoding module and the query processing network, the training comprising providing the signature encoding module with a reference image containing an object of interest and having the object of interest marked within the reference image. The training also comprises generating a digital signature of the object of interest and at least some context associated with the object of interest in the reference image. The training also comprises providing the query processing module with a query image and the digital signature representing the object of interest and at least some of the context associated with the object of interest in the reference image. The training also comprises identifying the object of interest within the query image based upon the digital signature of the object of interest. The training also comprises modifying at least one of the signature encoding module or the query processing module based upon a qualitative or quantitative difference between the object of interest identified within the query image and the object of interest marked in the reference image.

In some embodiments the method further comprises comparing the object of interest identified within the query image and the object of interest marked in the reference image using an objective function, wherein modifying at least one of the signature encoding network or the query processing module comprises modifying at least one of the signature encoding network or the query processing module based upon a result of the objective function. In some embodiments of the method, modifying at least one of the signature encoding network or the query processing module comprises modifying at least one of the signature encoding network or the query processing module to reduce a qualitative or quantitative difference between the object of interest identified within the query image and the object of interest marked in the reference image. In some embodiments of the method, the training of at least one of the signature encoding module and the query processing module includes concomitantly training both the signature encoding module and the query processing module.

In another embodiment, an apparatus for training at least one of a signature encoding module and a query processing module is provided. The apparatus includes at least one processor and at least one memory including computer program code with the at least one memory and the computer program code configured to, with the at least one processor, cause the apparatus to train at least one of the signature encoding module and the query processing network. In this regard, the at least one memory and the computer program code are configured to, with the at least one processor, cause the apparatus to train the signature encoding module by providing the signature encoding module with a reference image containing an object of interest and having the object of interest marked within the reference image. The at least one memory and the computer program code are configured to, with the at least one processor, cause the apparatus to train the signature encoding module by generating a digital signature of the object of interest and at least some context associated with the object of interest in the reference image. The at least one memory and the computer program code are configured to, with the at least one processor, cause the apparatus to train the query processing module by providing the query processing module with a query image and the digital signature representing the object of interest and at least some of the context associated with the object of interest in the reference image. The at least one memory and the computer program code are also configured to, with the at least one processor, cause the apparatus to train the query processing module by identifying the object of interest within the query image based upon the digital signature of the object of interest. The at least one memory and the computer program code are further configured to, with the at least one processor, cause the apparatus to modify at least one of the signature encoding module or the query processing module based upon a qualitative or quantitative difference between the object of interest identified within the query image and the object of interest marked in the reference image.

In some embodiments, the at least one memory and the computer program code are further configured to, with the at least one processor, cause the apparatus to compare the object of interest identified within the query image and the object of interest marked in the reference image using an objective function. In this example embodiment, the at least one memory and the computer program code are configured to, with the at least one processor, cause the apparatus to modify at least one of the signature encoding network or the query processing module based upon a result of the objective function. In some embodiments of the method, the at least one memory and the computer program code are configured to, with the at least one processor, cause the apparatus to modify at least one of the signature encoding network or the query processing module to reduce a qualitative or quantitative difference between the object of interest identified within the query image and the object of interest marked in the reference image. In some embodiments, the at least one memory and the computer program code are further configured to, with the at least one processor, cause the apparatus to train at least one of the signature encoding module and the query processing module by concomitantly training both the signature encoding module and the query processing module.

In a further embodiment, an apparatus for training at least one of a signature encoding module and a query processing module is provided. The apparatus includes means for training at least one of the signature encoding module or the query processing network with the means for training comprising means for providing the signature encoding module with a reference image containing an object of interest and having the object of interest marked within the reference image. The means for training also comprises means for generating a digital signature of the object of interest and at least some context associated with the object of interest in the reference image. The means for training also comprises means for providing the query processing module with a query image and the digital signature representing the object of interest and at least some of the context associated with the object of interest in reference image. The means for training also comprises means for identifying the object of interest within the query image based upon the digital signature of the object of interest within the context of the reference image. The means for training also comprises means for modifying at least one of the signature encoding module or the query processing module based upon a qualitative or quantitative difference between the object of interest identified within the query image and the object of interest marked in the reference image.

In some embodiments the apparatus further comprises means for comparing the object of interest identified within the query image and the object of interest marked in the reference image using an objective function, and the means for modifying at least one of the signature encoding network or the query processing module comprises means for modifying at least one of the signature encoding network or the query processing module based upon a result of the objective function. In some embodiments of the apparatus, the means for modifying at least one of the signature encoding network or the query processing module comprises means for modifying at least one of the signature encoding network or the query processing module to reduce a qualitative or quantitative difference between the object of interest identified within the query image and the object of interest marked in the reference image. In some embodiments of the apparatus, the means for training at least one of the signature encoding module and the query processing module includes means for concomitantly training both the signature encoding module and the query processing module.

In yet another example embodiment, a computer program product for training at least one of a signature encoding module and a query processing module is provided. The computer program product includes at least one non-transitory computer-readable storage medium having computer-executable program code instructions stored therein with the program code instructions being configured to train at least one of the signature encoding module and the query processing network. The program code instructions configured to train the signature encoding module include program code instructions configured to provide the signature encoding module with a reference image containing an object of interest and having the object of interest marked within the reference image. The program code instructions configured to train the signature encoding module also include program code instructions configured to generate a digital signature of the object of interest and at least some context associated with the object of interest in the reference image. The program code instructions configured to train the query processing module include program code instructions configured to provide the query processing module with a query image and the digital signature representing the object of interest and at least some of the context associated with the object of interest in the reference image. The program code instructions configured to train the signature encoding module also include program code instructions configured to identify the object of interest within the query image based upon the digital signature of the object of interest. The program code instructions are further configured to modify at least one of the signature encoding module or the query processing module based upon a qualitative or quantitative difference between the object of interest identified within the query image and the object of interest marked in the reference image.

In some embodiments, the program code instructions are further configured to compare the object of interest identified within the query image and the object of interest marked in the reference image using an objective function. In this example embodiment, the program code instructions are configured to modify at least one of the signature encoding network or the query processing module based upon a result of the objective function. In some embodiments, the program code instructions are configured to modify at least one of the signature encoding network or the query processing module to reduce a qualitative or quantitative difference between the object of interest identified within the query image and the object of interest marked in the reference image. In some embodiments, the program code instructions configured to train at least one of the signature encoding module and the query processing module include program code instructions configured to concomitantly train both the signature encoding module and the query processing module.

In another embodiment, a method for generating and utilizing a digital signature to identify an object of interest is provided. The method includes providing a reference image containing the object of interest to a signature encoding module, with an indication of the object of interest within the reference image also being provided. The method also includes generating, with the signature encoding module, the digital signature representing the object of interest and at least some context associated with the object of interest in reference image. The method also includes providing the digital signature representing the object of interest and at least some of the context associated with the object of interest and at least one query image to a query processing module. The method also includes identifying, by the query processing module, the object of interest within the at least one query image based upon the digital signature of the object of interest.

In some embodiments, the method also includes augmenting the at least one query image based upon the object of interest identified therein. In some embodiments, augmenting the at least one query image comprises overlaying a representation of the object of interest that has been identified based upon the digital signature upon the at least one query image.

In some embodiments of the method, the query processing module comprises a multi-layer network that includes a plurality of neural network layers, and providing the digital signature representing the object of interest and at least some of the context associated with the object of interest and the at least one query image to the query processing module comprises combining the digital signature representing the object of interest and at least some of the context associated with the object of interest with a decomposition of the at least one query image using an aggregation of the plurality of neural network layers.

In some embodiments, the method also includes causing the digital signature of the object of interest to be stored, retrieved and used independent of the reference image.

In some embodiments of the method, the signature encoding module comprises a plurality of neural network layers configured to decompose the reference image and a representation therein of the object of interest, to extract features therefrom, and to derive a signature representing a combination of the reference image and the object of interest.

In some embodiments of the method, generating the digital signature comprises analyzing the reference image with different resolution and extracting additional features from the reference image as the reference image is advanced from one neural network layer to another neural network layer.

In some embodiments of the method, the signature encoding module comprises a convolutional neural network comprising the plurality of neural network layers.

In an embodiment, an apparatus is provided that includes means for providing a reference image containing the object of interest to a signature encoding module, with an indication of the object of interest within the reference image also being provided. The apparatus also includes means for generating, with the signature encoding module, the digital signature representing the object of interest and at least some context associated with the object of interest in reference image. The apparatus also includes means for providing the digital signature representing the object of interest and at least some of the context associated with the object of interest and at least one query image to a query processing module. The apparatus also includes means for identifying, by the query processing module, the object of interest within the at least one query image based upon the digital signature of the object of interest.

In some embodiments, the apparatus also includes means for augmenting the at least one query image based upon the object of interest identified therein. In some embodiments, the means for augmenting the at least one query image comprise means for overlaying a representation of the object of interest that has been identified based upon the digital signature upon the at least one query image.

In some embodiments of the apparatus, the query processing module comprises a multi-layer network that includes a plurality of neural network layers, and the means for providing the digital signature representing the object of interest and at least some of the context associated with the object of interest and the at least one query image to the query processing module comprises means for combining the digital signature representing the object of interest and at least some of the context associated with the object of interest with a decomposition of the at least one query image using an aggregation of the plurality of neural network layers.

In some embodiments, the apparatus also includes means for causing the digital signature of the object of interest to be stored, retrieved and used independent of the reference image.

In some embodiments of the apparatus, the signature encoding module comprises a plurality of neural network layers configured to decompose the reference image and a representation therein of the object of interest, to extract features therefrom, and to derive a signature representing a combination of the reference image and the object of interest.

In some embodiments of the apparatus, the means for generating the digital signature comprises means for analyzing the reference image with different resolution and extracting additional features from the reference image as the reference image is advanced from one neural network layer to another neural network layer.

In some embodiments of the apparatus, the signature encoding module comprises a convolutional neural network comprising the plurality of neural network layers.

In a further embodiment, an apparatus is provided that includes at least one processor and at least one memory storing computer program code with the at least one memory and the computer program code configured to, with the processor, cause the apparatus to provide a reference image containing the object of interest to a signature encoding module, with an indication of the object of interest within the reference image also being provided. The at least one memory and the computer program code are also configured to, with the processor, cause the apparatus to generate, with the signature encoding module, the digital signature representing the object of interest and at least some context associated with the object of interest in the reference image. The at least one memory and the computer program code are also configured to, with the processor, cause the apparatus to provide the digital signature representing the object of interest and at least some of the context associated with the object of interest and at least one query image to a query processing module. The at least one memory and the computer program code are also configured to, with the processor, cause the apparatus to identify, by the query processing module, the object of interest within the at least one query image based upon the digital signature of the object of interest.

In some embodiments, the at least one memory and the computer program code are also configured to, with the processor, cause the apparatus to augment the at least one query image based upon the object of interest identified therein. In some embodiments, augmenting the at least one query image comprises overlaying a representation of the object of interest that has been identified based upon the digital signature upon the at least one query image.

In some embodiments of the apparatus, the query processing module comprises a multi-layer network that includes a plurality of neural network layers, and providing the digital signature representing the object of interest and at least some of the context associated with the object of interest and the at least one query image to the query processing module comprises combining the digital signature representing the object of interest and at least some of the context associated with the object of interest with a decomposition of the at least one query image using an aggregation of the plurality of neural network layers.

In some embodiments, the at least one memory and the computer program code are also configured to, with the processor, cause the apparatus to cause the digital signature of the object of interest to be stored, retrieved and used independent of the reference image.

In some embodiments of the apparatus, the signature encoding module comprises a plurality of neural network layers configured to decompose the reference image and a representation therein of the object of interest, to extract features therefrom, and to derive a signature representing a combination of the reference image and the object of interest.

In some embodiments of the apparatus, generating the digital signature comprises analyzing the reference image with different resolution and extracting additional features from the reference image as the reference image is advanced from one neural network layer to another neural network layer.

In some embodiments of the apparatus, the signature encoding module comprises a convolutional neural network comprising the plurality of neural network layers.

In another embodiment, a computer program product is provided that includes a non-transitory computer readable medium having program code portions stored thereon with the program code portions being configured, upon execution, to provide a reference image containing the object of interest to a signature encoding module, with an indication of the object of interest within the reference image also being provided. The program code portions are also configured to generate, with the signature encoding module, the digital signature representing the object of interest and at least some context associated with the object of interest in reference image. The program code portions are also configured to provide the digital signature representing the object of interest and at least some of the context associated with the object of interest and at least one query image to a query processing module. The program code portions are also configured to identify, by the query processing module, the object of interest within the at least one query image based upon the digital signature of the object of interest.

In some embodiments, the program code portions are also configured to augment the at least one query image based upon the object of interest identified therein. In some embodiments, augmenting the at least one query image comprises overlaying a representation of the object of interest that has been identified based upon the digital signature upon the at least one query image.

In some embodiments of the computer program product, the query processing module comprises a multi-layer network that includes a plurality of neural network layers, and providing the digital signature representing the object of interest and at least some of the context associated with the object of interest and the at least one query image to the query processing module comprises combining the digital signature representing the object of interest and at least some of the context associated with the object of interest with a decomposition of the at least one query image using an aggregation of the plurality of neural network layers.

In some embodiments, the program code portions are also configured to cause the digital signature of the object of interest to be stored, retrieved and used independent of the reference image.

In some embodiments of the computer program product, the signature encoding module comprises a plurality of neural network layers configured to decompose the reference image and a representation therein of the object of interest, to extract features therefrom, and to derive a signature representing a combination of the reference image and the object of interest.

In some embodiments of the computer program product, generating the digital signature comprises analyzing the reference image with different resolution and extracting additional features from the reference image as the reference image is advanced from one neural network layer to another neural network layer.

In some embodiments of the computer program product, the signature encoding module comprises a convolutional neural network comprising the plurality of neural network layers.

In another embodiment, an apparatus is provided that is configured to generate and utilize a digital signature to identify an object of interest. The apparatus includes a signature encoding module configured to receive a reference image containing the object of interest, with an indication of the object of interest within the reference image also being provided, and the signature encoding module is also configured to generate the digital signature representing the object of interest and at least some context associated with the object of interest in the reference image. The apparatus also includes a query processing module configured to receive the digital signature representing the object of interest and at least some of the context associated with the object of interest and at least one query image, the query processing module also being configured to identify the object of interest within the at least one query image based upon the digital signature of the object of interest.

In some embodiments, the apparatus further comprises processing circuitry configured to augment the at least one query image based upon the object of interest identified therein. In some embodiments, the processing circuitry is configured to augment the at least one query image by overlaying a representation of the object of interest that has been identified based upon the digital signature upon the at least one query image.

In some embodiments of the apparatus, the query processing module comprises a multi-layer network that includes a plurality of neural network layers, and the query processing module is further configured to combine the digital signature representing the object of interest and at least some of the context associated with the object of interest with a decomposition of the at least one query image using an aggregation of the plurality of neural network layers.

In some embodiments, the signature encoding module is further configured to cause the digital signature of the object of interest to be stored, retrieved and used independent of the reference image.

In some embodiments, the signature encoding module comprises a plurality of neural network layers configured to decompose the reference image and a representation therein of the object of interest, to extract features therefrom and to derive a signature representing a combination of the reference image and the object of interest. In some embodiments, the signature encoding module is configured to generate the digital signature by analyzing the reference image with different resolution and extracting additional features from the reference image as the reference image is advanced from one neural network layer to another neural network layer. In some embodiments, the signature encoding module comprises a convolutional neural network comprising the plurality of neural network layers.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to train a signature encoding module and a query processing module to identify objects of interest within one or more images. The method, apparatus and computer program product of an example embodiment are configured to train a signature encoding module to generate a digital signature representative of an object of interest and at least some of the context associated with the object of interest within an image and to correspondingly train a query processing module to utilize the digital signature to identify the object of interest within another image. In this regard, portable compact signatures may be generated and utilized to allow for the ability to efficiently recognize and highlight objects of interest within images.

Embodiments herein describe training and usage of a signature encoding module and a query processing module in order to generate and utilize digital signatures. As described below, the signature encoding module and the query processing module may be trained concomitantly. Alternatively, one of the signature encoding module and the query processing module may have been previously trained and only the other one of the signature encoding module and the query processing module is trained, utilizing the one that has been previously trained.

In some embodiments, the signature encoding module and query processing module may be configured in various manners, but, in one embodiment, are each deep learning models. The respective deep learning models of the signature encoding module and the query processing module may be trained, such as by being trained concomitantly. By way of example, but not of limitation, the signature encoding module and/or the query processing module may each comprise a layered or recurrent network, such as a pyramidal network, and, in one embodiment, a Convolutional Neural Network (CNN), such as a Residual Neural Network (a ResNet). In some embodiments, the query processing module may include one or more aggregating layers configured to combine a digital signature generated by the signature encoding module with a query image decomposition.

The signature encoding module may be configured to, using a reference image having an area of the image demarcated (e.g., by masking the reference image) to signify an object of interest (e.g., place of interest, or the like), generate one or more digital signatures (e.g., sequences of bytes) that represent the object of interest in the context of the reference image. While embodiments herein describe demarcation of reference images by using image masks, it is to be appreciated that other methods of demarcation may be used. As also described below, the digital signatures that are generated by the signature encoding module are dependent not only upon the object of interest, but also upon at least some of the context associated with the object of interest. This context may include the environment or other surroundings located about the object of interest. In other words, the context associated with an object of interest is context that is visible when viewing the object of interest and, for at least some objects of interest, is external to the object of interest. By way of example, in an instance in which a particular building is the object of interest, the context may include other adjacent buildings as well as other features, e.g., statues, street signs, open spaces, etc., in the vicinity of the building.

The query processing module may be configured to, using one or more digital signatures generated by the signature encoding module and one or more query images, identify the object of interest within the one or more query images based upon the digital signature of the same object of interest in combination with the context with which the object of interest is associated. By taking into account the context associated with an object of interest in the generation of the digital signature, a particular object of interest may be identified within a query image even if there are other similar objects present. For example, in an example embodiment in which the object of interest is a particular franchised restaurant located at a specific location, the generation of a digital signature of the particular restaurant that takes into account the context associated the specific location such that the particular restaurant can be distinguished from other restaurants of the same franchise that are at different locations. Although the different restaurants may all have the same appearance, the context associated with the restaurants is different from one restaurant to another, thereby allowing the digital signature to distinguish the restaurants. By taking the context associated with an object of interest into account in the generation of the digital signature, the query processing module is capable of identifying a particular object of interest within a query image even if occlusions or distortions in the query image prevent the particular object of interest from being fully visible in the query image.

In some embodiments, the signature encoding module and query processing module may perform operations on multiple images (e.g., reference images and query images) concomitantly during the training process. In some embodiments, once a digital signature is generated by the signature encoding module, the digital signature may be stored (e.g., in memory and/or database 24) and used in other processes (e.g., query processing module processes) without having to use the original reference images and associated masks. In this regard, the stored digital signature provides a compact representation of an object of interest, thereby providing a technical advantage in terms of storage efficiency and the speed and efficiency with which digital signatures representative of objects of interest may be retrieved and processed, such as in conjunction with the identification of an object of interest within a query image.

The apparatus that is configured to train the signature encoding module and the query processing module to generate and utilize digital signatures may be any of a wide variety of computing devices. For example, the apparatus may be embodied by a server, a computer workstation, a distributed network of computing devices, a personal computer, a navigation or mapping system, or any other type of computing device.

Figure 1:
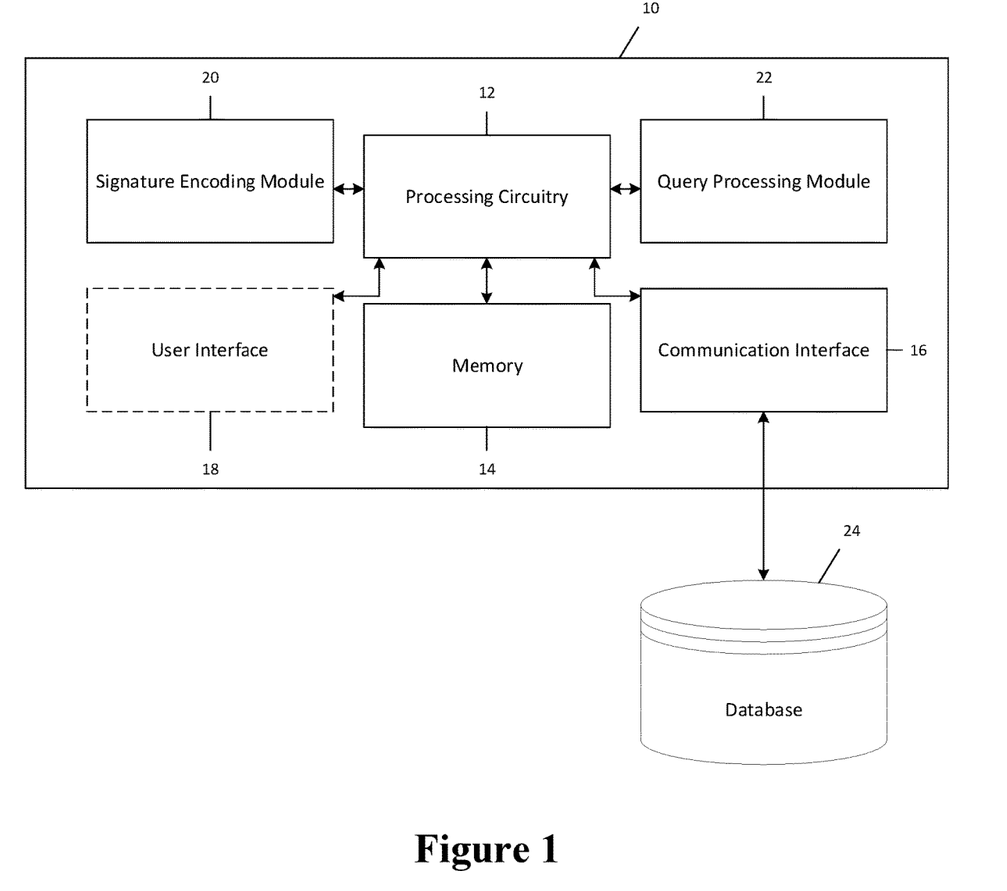
FIG. 1 is a block diagram of an apparatus that may be specifically configured in accordance with an example embodiment.

Regardless of the manner in which the apparatus is embodied, however, the apparatus 10 includes, is associated with, or is in communication with processing circuitry 12, memory 14, a communication interface 16, signature encoding module 20, query processing module 22, and optionally a user interface 18 as shown in FIG. 1. In some embodiments, the processing circuitry 12 (and/or co-processors or any other processors assisting or otherwise associated with the processing circuitry) can be in communication with the memory 14 via a bus for passing information among components of the apparatus. The memory 14 can be non-transitory and can include, for example, one or more volatile and/or non-volatile memories. In other words, for example, the memory 14 may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory 14 can be configured to buffer input data for processing by the processing circuitry 12. Additionally or alternatively, the memory can be configured to store instructions for execution by the processing circuitry.

The processing circuitry 12 can be embodied in a number of different ways. For example, the processing circuitry 12 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 12 can include one or more processing cores configured to perform independently. A multi-core processor can enable multiprocessing within a single physical package. Additionally or alternatively, the processing circuitry 12 can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry 12 can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., map data, route data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

The apparatus 10 may also comprise a signature encoding module 20. The signature encoding module may be configured to perform operations associated with generating a digital signature. For example, the signature encoding module 20 may receive, as input, a reference image that includes an object of interest that has been demarcated and be trained to provide, as output, a digital signature representing the object of interest and at least some of the context associated with the object of interest as further described herein.

In some embodiments, the signature encoding module may comprise a deep learning model, such as a CNN and, more particularly, a ResNet. In this regard, the signature encoding module may comprise a layered or recurrent structure, such as a pyramidal structure, of neural network layers configured to extract features from reference images provided to the signature encoding module such that a digital signature may be derived.

The apparatus 10 may also comprise a query processing module 22. The query processing module 22 may be configured to perform operations associated with identifying objects of interest within query images based upon a digital signature representative of an object of interest and at least some of the context associated with the object of interest. For example, the query processing module may receive, as input, one or more query images in addition to a digital signature, such as a digital signature generated by the signature encoding module 20 and stored by the memory 14 and/or a database 24. Based thereupon, the query processing module may be trained to predict a location in the one or more query images that contains the object of interest. In some embodiments, the query processing module may also comprise a deep learning model, such as a CNN, e.g., a ResNet. The query processing module of an example embodiment may also comprise a layered or recurrent structure, such as a pyramidal structure, of neural network layers configured to extract features from one or more query images and to utilize the digital signature to identify the corresponding object of interest within the one or more query images.

Although depicted in FIG. 1 to be distinct from the processing circuitry 12, the signature encoding module 20 and/or the query processing module 22 may be embodied by the processing circuitry in other example embodiments.

In some embodiments, the database 24 may be configured to store representations of a plurality of images and associated metadata. In some embodiments, the representations of the plurality of images may be the embeddings, such as hashable embeddings, generated for the respective images, although different or additional representations of the images may be stored in the database in other embodiments including storage of the images themselves. The metadata for the plurality of images may comprise location data (e.g., GPS coordinates) that defines the location at which the image was taken. The metadata for the plurality of images may also comprise camera-related information, such as a camera orientation at the time that the image was captured and/or other camera-related information.

The database 24 may also store one or more digital signatures associated with respective images. The digital signatures are representative of an object of interest within a respective image, as well as at least some of the context associated with the object of interest within the image. One or more digital signatures may be associated with each image. In an embodiment in which multiple digital signatures are associated with a respective image, each digital signature may be representative of a different object of interest and at least some context associated therewith within the object of interest.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Figure 2:
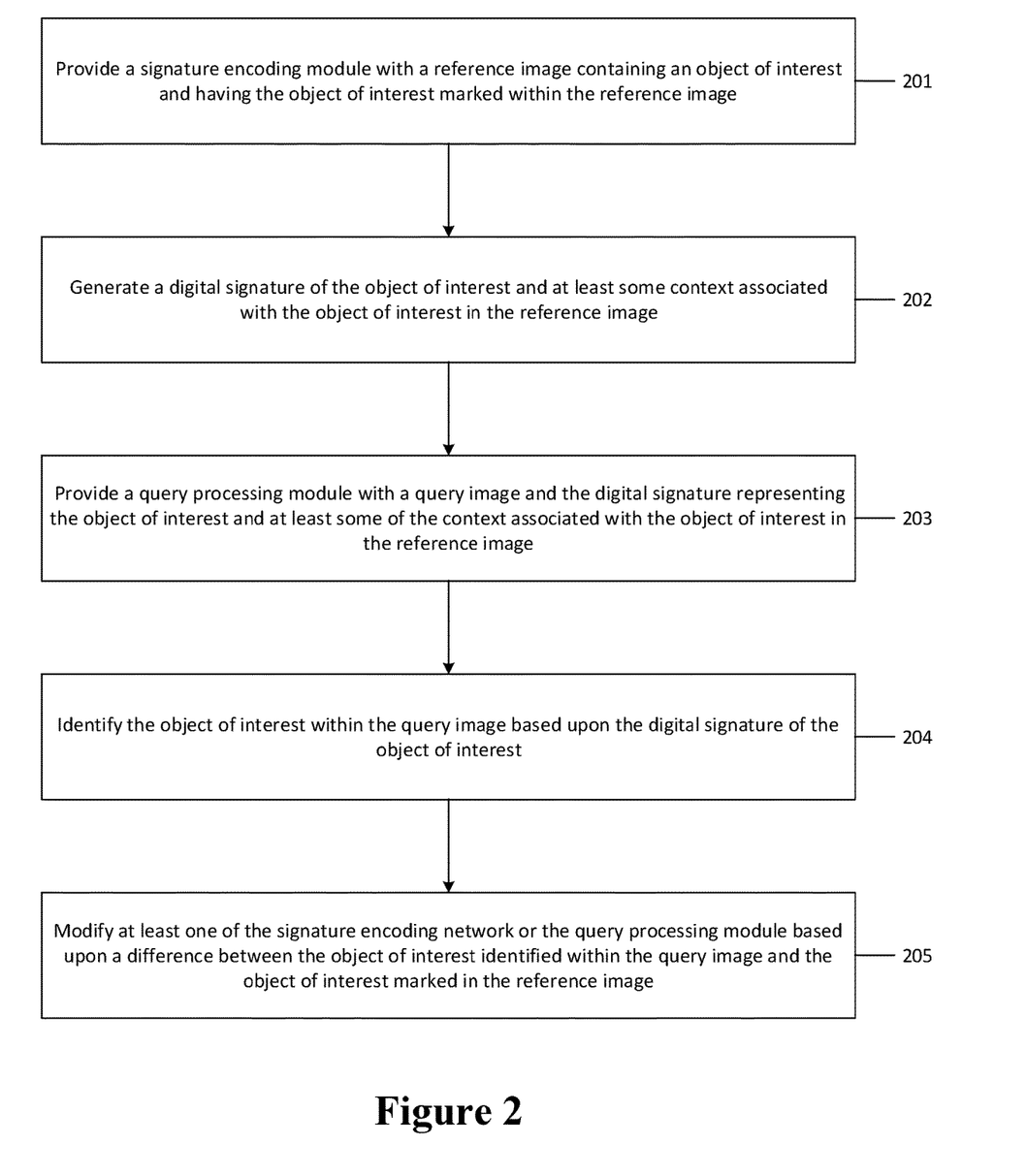
FIG. 2 is a flowchart illustrating the operations performed, such as by the apparatus of FIG. 1, in order to train a signature encoding module and a query processing module in accordance with an example embodiment.

Referring now to FIG. 2, the operations performed, such as by the apparatus 10 of FIG. 1, in order to train at least one of a signature encoding module 20 or a query processing module 22 and, by way of a more specific example, to concomitantly train both the signature encoding module 20 and the query processing module 22 are depicted. With respect to the concomitant training of the signature encoding module and the query processing module, the signature encoding module and the query processing module may be trained concurrently. Alternatively, the signature encoding module and the query processing module may be trained in an intermittent manner in which the signature encoding module is initial trained and the signature encoding module, as trained, may then remain static while the query processing module is trained. The signature encoding module could then again be further trained while the query processing module remains static, and so on in an iterative manner. In any instance, the training of the signature encoding module and the query processing module is interdependent. As shown in block 201, the apparatus includes means, such as the processing circuitry 12, memory 14, the signature encoding module, and/or the like, for providing the signature encoding module with a reference image containing an object of interest. The object of interest is marked within the reference image that is provided to the signature encoding module. Although described herein as the provision of a reference image, a plurality of reference images and, in an example embodiment, a video comprised of a plurality of frames may be provided to the signature encoding module, each of which is processed as described herein. As such, reference herein to the provision of a reference image also comprises the provision of a plurality of reference images in other example embodiments.

For example, the apparatus 10 may include means, such as the processing circuitry 12, memory 14, the communication interface 16, and/or the like, for receiving a reference image. The reference image may be received from a source external to and in communication with the apparatus (e.g., by way of communication interface 16), the database 24, from memory 14, and/or other sources.

In some embodiments, the reference image depicts an object of interest. For example, the reference image may be an image generated by a camera (e.g., a photograph or a frame from a video) such that the image depicts real-world content (e.g., buildings, roads, signs, landmarks, and/or other objects). In this regard, the object of interest may be content that is desired to be located in one or more other images (e.g., query images discussed further below). The object of interest is stationary in at least some example embodiments.

The reference image may be modified such that the object of interest within the reference image is demarcated. The object of interest may be demarcated in the reference image in various manners. For example, in some embodiments, in addition to a reference image, an image mask that demarcates the object of interest in the reference image may also be provided to the signature encoding module. For example, an image mask may take the form of a matrix having elements that correspond to one or more pixels of the reference image. In this example embodiment, the matrix may be configured to designate certain pixels of the reference image that include the object of interest. In other embodiments, the object of interest may be demarcated within the reference image itself. Demarcation of the object of interest may occur prior to the apparatus 10 receiving the reference image.

Once the reference image and demarcation of the object of interest within the reference image are provided to the signature encoding module 20, the signature encoding module may generate a digital signature for the object of interest and for at least some context associated with the object of interest. As shown in block 202, the apparatus includes means, such as the processing circuitry 12, memory 14, the signature encoding module 20, and/or the like, for generating a digital signature of the object of interest and at least some context associated with the object of interest in reference image.

As described herein, "context" may refer to a portion of an image that is near to, such as by being adjacent to, proximate or surrounding, the object of interest. For example, in an instance in which the object of interest in a reference image is a particular building, the context may comprise one or more buildings or other objects that are in close proximity to the particular building. In an embodiment in which the object of interest is demarcated, such as with an image mask, the context is generally represented by a portion of the reference image that is outside of, but adjacent or otherwise proximate or near to the image mask. Embodiments herein describe an object of interest that is stationary (e.g., a building), as well as context surrounding the object of interest being also stationary (e.g., neighboring buildings, locations, or the like). Since the object of interest is stationary, the stationary context surrounding the object of interest may be considered in conjunction with the identification of the object of interest in contrast to the identification or recognition of mobile or deformable objects of interest, which cannot rely upon the context in the vicinity thereof since the context may change based upon the mobility or deformability of these other object of interest. The context is typically implicit and need not be specifically designated as such.

In some embodiments, the signature encoding module may comprise a plurality of neural network layers configured to decompose the reference image and a representation therein of the object of interest and at least some of the context associated with the object of interest to extract features therefrom and to derive a digital signature representing a combination of the object of interest and at least some of the context associated with the object of interest. For example, in some embodiments, the digital signature may be derived based on the object of interest and at least some context associated with the object of interest, such as one or more objects in the reference image other than the object of interest.

In some embodiments, the apparatus, such as the signature encoding module 20, is configured to generate the digital signature by analyzing the reference image at different (e.g., higher) resolutions and extracting additional features from the reference image as the reference image is advanced from a courser resolution processed by one neural network layer to a finer resolution processed by another, subsequent neural network layer.

Figure 3:
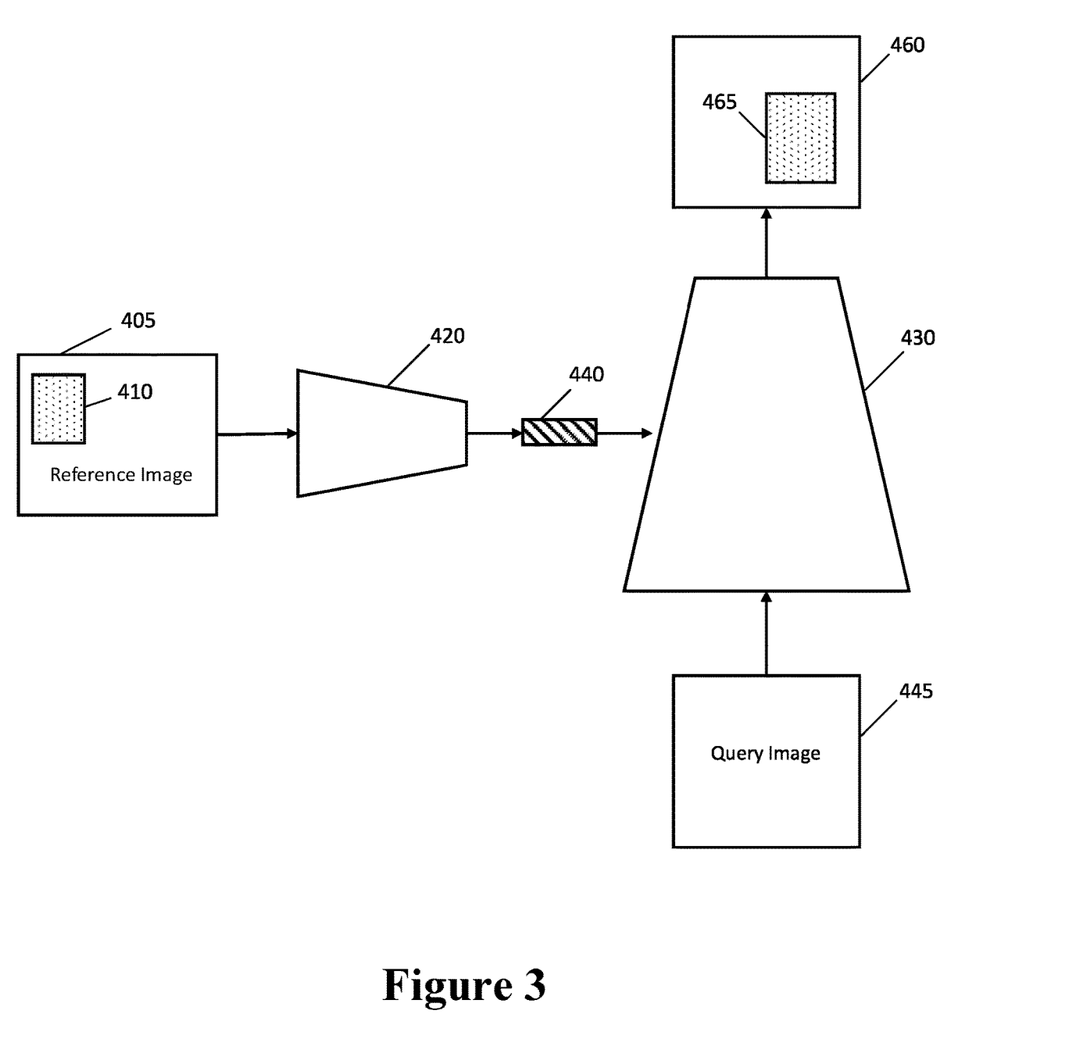
FIG. 3 is a graphical representation of operations performed, such as by the apparatus of FIG. 1, utilizing a signature encoding module and query processing module in accordance with an example embodiment.

To illustrate, FIG. 3 depicts a graphical representation of an apparatus 10 having a signature encoding module 420 that is provided with a reference image 405 having a demarcated object of interest 410. As shown, the signature encoding module 420 comprises a plurality of neural network layers in a multi-scale, e.g., layered or recurrent, structure configured to decompose the reference image and a representation therein of the object of interest to extract features therefrom. As a result, the signature encoding module is configured to derive a digital signature 440 representing the object of interest that was demarcated in the reference image along with at least some of the context associated with the object of interest.

In some embodiments, the digital signature may comprise a sequence of bits and bytes unique to the object of interest and the associated context. In this regard, the digital signature may be derived based on both the object of interest and at least some of its context such that different digital signatures would be generated for identical objects of interest if those objects of interest were in different locations with different context associated therewith.

In some embodiments, once a digital signature has been generated, the digital signature may be stored, such that the digital signature may be retrieved and used independent of the reference image in order to identify the corresponding object of interest in other images. In this regard, the apparatus 10 includes means, such as the processing circuitry 12, memory 14, the database 24 and/or the like, for storing the digital signature. For example, the digital signature may be stored in memory 14, database 24, and/or another repository or storage source.

In conjunction with the technique for concomitantly training the signature encoding module 20 and the query processing module 22, once the digital signature is generated (and optionally stored) as described above, the digital signature may be provided to the query processing module. In addition to the digital signature, one or more query images may be provided to the query processing module such that the query processing module, once properly trained, can identify the object of interest that is represented by the digital signature within the one or more query images. In this regard, at operation 203, the apparatus includes means, such as the processing circuitry 12, memory 14, the query processing module 20, and/or the like, for providing the query processing module with a query image and the digital signature representing the object of interest and at least some of the context associated with the object of interest.

For example, in some embodiments, a query image may comprise an image similar to a reference image (e.g., a photograph or video of real-world content), but may be a photograph or video taken from a different vantage point from the location at which the reference image was taken. In this regard, the query image may depict the same object of interest (and associated context) as the reference image, albeit from a different angle or viewpoint. In some embodiments, during training of the query processing module, a query image that does not depict the object of interest may be provided to the query processing module, along with one or more query images that do include the object of interest, in order to more effectively train the query processing module to identify the object of interest only in those query images that actually include the object of interest.

Query images may be provided to the query processing module 22 in a number of ways. For example, query images may be received from a source external to and in communication with the apparatus (e.g., by way of communication interface 16), the database 24, from memory 14, and/or other sources.

As illustrated for example in FIG. 3, a digital signature 440, such as a digital signature generated by the signature encoding module 420, is provided to a query processing module 430. The digital signature may be provided directly by the signature encoding module, or by a database or other data repository that has stored the digital signature. Additionally, at least one query image 445 is provided to the query processing module 430, as described above. In some embodiments, the query processing module may combine the received digital signature representing the object of interest with a decomposition of the query image using one or more aggregating layers of the plurality of neural network layers of the query processing module 430. At operation 204, the apparatus includes means, such as the processing circuitry 12, memory 14, the query processing module 22, and/or the like, for identifying the object of interest within the query image based upon the digital signature of the object of interest and at least some of the context associated with the object of interest. In some embodiments, the apparatus, such as the processing circuitry, may be configured to concurrently process a plurality of images so as to identify a respective object of interest. The use of multiple images can be useful to increase the accuracy with which the object of interest is identified. For example, for a short video clip, the apparatus, such as the processing circuitry, may be configured to process a number of frames of the video clip to improve the performance in regards to identification of an object of interest within any individual frame as information regarding the manner in which one frame is processed may facilitate the processing of other frames and the identification of the same object of interest therein.

In some embodiments, the apparatus includes means, such as the processing circuitry 12, memory 14, the query processing module 22, and/or the like, for augmenting the at least one query image based upon the object of interest identified therein. The query image may be augmented in various manners to identify the object of interest. For example, as shown in FIG. 3, an augmented image 460 may be provided as an output of the query processing module 430. In this regard, the query image may be augmented by overlaying a representation 465 of the object of interest that has been identified based upon the digital signature upon the query image, thereby producing an augmented image 460. For example, in some embodiments, the augmented image may comprise an image mask demarking the object of interest within the query image. Although the digital signature is representative of both the object of interest and at least some context associated with the object of interest, the portion of the query image that is designated, such as by the augmentation, as being representative of the object of interest is that portion that illustrates the object of interest, but not the context associated therewith.

Once the object of interest has been identified in the query image, at operation 205, the apparatus includes means, such as the processing circuitry 12, memory 14, the signature encoding module 20, the query processing module 22 and/or the like, for modifying at least one of the signature encoding module or the query processing module based upon a qualitative or quantitative difference between the object of interest identified within the query image and the object of interest marked in the reference image. For example, the apparatus may include means, such as the processing circuitry or the like, for comparing the object of interest identified within the query image and the object of interest marked in the reference image using an objective function, such as a cost function or a loss function, with at least one of the signature encoding module or the query processing module then being modified based upon a result of the objective function. In some embodiments, at least one of the signature encoding module and the query processing module may be modified to reduce a qualitative or quantitative difference between the object of interest identified within the query image and the object of interest marked in the reference image.

By repeating the foregoing process a plurality of times by providing the signature encoding module 20 with a reference image with an object of interest being marked therein and then utilizing the resulting digital signature as an input along with one or more query images to the query processing module 22 and then modifying the signature encoding module and/or the query processing module based upon a qualitative or quantitative difference between the object of interest identified within the query image and the object of interest marked in the reference image, the signature encoding module and the query processing module may be trained to perform more accurately. In this regard, the signature encoding module may be trained to generate digital signatures that permit an object to interest to be accurately identified, and the query processing module may be trained to accurately identify the object of interest based upon a digital signature representative of the object of interest and at least some of the context associated therewith. Moreover, as a result of the training of the signature encoding module, the context (such as in terms of the amount of the context and/or the type of context) that is included with the object of interest in conjunction with the generation of the digital signature is a function of the training of the signature encoding process with the context that is included being defined to be that context that allows digital signatures to be generated that permit an object to interest to be accurately identified.

By appropriately training the signature encoding module 20 and the query processing module 22 to generate digital signatures representative of objects of interest and the context associated therewith and to identify an object of interest from a query image utilizing a digital signature of the object of interest, respectively, objects of interest may be reliably identified from images based upon digital signatures of the objects of interest. Thus, a database of digital signatures of various objects of interest (and the associated context) may be maintained, thereby providing for efficient storage of information associated with a wide variety of objects of interest without necessarily having to store the corresponding images. By utilizing the digital signatures, the objects of interest may subsequently be identified in query images in a manner that conserves processing resources and is more timely than at least some other image analysis techniques.

FIG. 2 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, although a supervised learning technique has been described in conjunction with the training of the signature encoding module 20 and the query processing module 22, various forms of unsupervised learning or partially supervised learning may, instead, be employed in other example embodiments. Additionally, while the signature encoding module and the query processing module may be trained concomitantly, the method, apparatus and computer program product of an example embodiment are configured to train one of the signature encoding module or the query processing module with the other one of the signature encoding module or the query processing module having been previously trained. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating and utilizing a digital signature to identify an object of interest, the method comprising:
concurrently training both a signature encoding module, to generate one or more digital signatures representative of one or more objects of interest, and a query processing module to identify the one or more objects of interest within an image, each module including a plurality of neural network layers, wherein concurrently training both the signature encoding module and the query processing module further comprises:
providing the signature encoding module with a first reference image containing a first object of interest that is marked within the first reference image;
generating a first digital signature of the first object of interest and at least some context associated with the first object of interest in the first reference image;
providing the query processing module with a first query image and the first digital signature representing the first object of interest and at least some of the context associated with the first object of interest in the first reference image;
identifying a second object of interest within the first query image based upon the first digital signature of the first object of interest; and
modifying at least one of the signature encoding module or the query processing module based upon a qualitative or quantitative difference between the first object of interest marked in the first reference image and the second object of interest identified within the first query image;
providing a reference image containing the object of interest to the signature encoding module, wherein an indication of the object of interest within the reference image is also provided;
generating, with the signature encoding module, the digital signature representing the object of interest and at least some context associated with the object of interest in the reference image;
providing (i) the digital signature representing the object of interest and at least some of the context associated with the object of interest and (ii) at least one query image to the query processing module; and
identifying, by the query processing module, the object of interest within the at least one query image based upon the digital signature of the object of interest.

2. The method according to claim 1, further comprising:
augmenting the at least one query image based upon the object of interest identified therein.

3. The method according to claim 1, wherein augmenting the at least one query image comprises overlaying a representation of the object of interest that has been identified based upon the digital signature upon the at least one query image.

4. The method according to claim 2, wherein augmenting the at least one query image comprises applying an image mask that diminishes or removes the object of interest within the query image.

5. The method according to claim 1, wherein the query processing module comprises a multi-layer network that includes the plurality of neural network layers, and wherein providing (i) the digital signature representing the object of interest and at least some of the context associated with the object of interest and (ii) the at least one query image to the query processing module comprises combining the digital signature representing the object of interest and at least some of the context associated with the object of interest with a decomposition of the at least one query image using an aggregation of the plurality of neural network layers.

6. The method according to claim 1, further comprising:
causing the digital signature of the object of interest to be stored, retrieved and used independent of the reference image.

7. The method according to claim 1, wherein the signature encoding module acomprising the plurality of neural network layers is configured to decompose the reference image and a representation therein of the object of interest, to extract features therefrom and to derive a signature representing a combination of the reference image and the object of interest.

8. The method according to claim 7, wherein generating the digital signature comprises analyzing the reference image with different resolution and extracting additional features from the reference image as the reference image is advanced from one neural network layer to another neural network layer.

9. The method according to claim 7, wherein the signature encoding module comprises a convolutional neural network comprising the plurality of neural network layers.

10. The method according to claim 1, further comprising:
comparing the second object of interest identified within the first query image and the first object of interest marked in the first reference image using an objective function, wherein the modifying of at least one of the signature encoding network and the query processing module is based upon a result of the objective function.

11. The method according to claim 10, wherein the modifying of at least one of the signature encoding network and the query processing module comprises reducing the qualitative or quantitative difference between the first object of interest marked in the reference image and the second object of interest identified within the query image.

12. An apparatus configured to generate and utilize a digital signature to identify an object of interest, the apparatus comprising:
a signature encoding module configured to receive a reference image containing the object of interest, wherein an indication of the object of interest within the reference image is also provided, and wherein the signature encoding module is also configured to generate the digital signature representing the object of interest and at least some context associated with the object of interest in the reference image; and
a query processing module configured to receive (i) the digital signature representing the object of interest and at least some of the context associated with the object of interest and (ii) at least one query image, wherein the query processing module is also configured to identify the object of interest within the at least one query image based upon the digital signature of the object of interest,
wherein each module includes a plurality of neural network layers, and
wherein both the signature encoding module and the query processing module are concurrently trained to generate one or more digital signatures representative of one or more objects of interest and to identify the one or more objects of interest within an image, respectively, by:
providing the signature encoding module with a first reference image containing a first object of interest that is marked within the first reference image;
generating a first digital signature of the first object of interest and at least some context associated with the first object of interest in the first reference image;
providing the query processing module with a first query image and the first digital signature representing the first object of interest and at least some of the context associated with the first object of interest in the first reference image;
identifying a second object of interest within the first query image based upon the first digital signature of the first object of interest; and
modifying at least one of the signature encoding module or the query processing module based upon a qualitative or quantitative difference between the first object of interest marked in the first reference image and the second object of interest identified within the first query image.

13. The apparatus according to claim 12, wherein the query processing module comprises a multi-layer network including the plurality of neural network layers, and wherein the query processing module is further configured to combine the digital signature representing the object of interest and at least some of the context associated with the object of interest with a decomposition of the at least one query image using an aggregation of the plurality of neural network layers.

14. The apparatus according to claim 12, wherein the signature encoding module is further configured to cause the digital signature of the object of interest to be stored, retrieved and used independent of the reference image.

15. The apparatus according to claim 12, wherein the signature encoding module comprising the plurality of neural network layers is configured to decompose the reference image and a representation therein of the object of interest, to extract features therefrom and to derive a signature representing a combination of the reference image and the object of interest.

16. The apparatus according to claim 15, wherein the signature encoding module is configured to generate the digital signature by analyzing the reference image with different resolution and extracting additional features from the reference image as the reference image is advanced from one neural network layer to another neural network layer.

17. The apparatus according to claim 15, wherein the signature encoding module comprises a convolutional neural network comprising the plurality of neural network layers.

18. The apparatus according to claim 12, wherein the query processing module is configured to augment the at least one query image by overlaying a representation of the identified object of interest upon the at least one query image.

19. The apparatus according to claim 18, wherein augmenting the at least one query image further comprises applying an image mask that diminishes or removes the object of interest within the query image.

20. The apparatus according to claim 12, further comprising:
a database configured to store representations of a plurality of images and associated metadata, wherein the representations of the plurality of images comprises one or both of: hashable embeddings and digital signatures generated for the respective plurality of images and the associated metadata comprises one or both of:

location data associated with the plurality of images and a camera orientation at a time that respective ones of the plurality of images were captured.

\* \* \* \* \*

UNITED STATES PATENT AND TRADEMARK OFFICE
CERTIFICATE OF CORRECTION

PATENT NO. : 11,900,662 B2
APPLICATION NO. : 17/123935
DATED : February 13, 2024
INVENTOR(S) : Ofer Melnik et al.

It is certified that error appears in the above-identified patent and that said Letters Patent is hereby corrected as shown below:

In the Claims

In Column 21, Line 9, Claim 7, delete "acomprising" and insert -- comprising --, therefor.

Signed and Sealed this
Eleventh Day of June, 2024

Katherine Kelly Vidal
*Director of the United States Patent and Trademark Office*